(12) United States Patent
Jacobs et al.

(10) Patent No.: US 6,438,857 B2
(45) Date of Patent: Aug. 27, 2002

(54) COORDINATE MEASUREMENT DEVICE

(75) Inventors: Klaus Jacobs, Koenigsbronn-Ochsenberg; Volker Piwek, Bremen; Joerg Walther, Gerstetten, all of (DE)

(73) Assignee: Carl-Zeiss Stiftung, Oberkocken (DE)

( * ) Notice: Subject to any disclaimer, the term of this patent is extended or adjusted under 35 U.S.C. 154(b) by 67 days.

(21) Appl. No.: 09/728,417

(22) Filed: Dec. 1, 2000

(30) Foreign Application Priority Data

Dec. 3, 1999 (DE) .......................................... 199 58 306

(51) Int. Cl.⁷ .............................................. G01B 5/004
(52) U.S. Cl. .......................................... 33/503; 33/1 M
(58) Field of Search ......................... 33/503, 1 M, 549, 33/551, 555

(56) References Cited

U.S. PATENT DOCUMENTS

| | | | | |
|---|---|---|---|---|
| 3,279,079 A | * | 10/1966 | Schiler | 33/1 M |
| 3,774,311 A | | 11/1973 | Stemple | |
| 3,823,482 A | * | 7/1974 | Schiler | 33/520 |
| 4,895,454 A | | 1/1990 | Kammkeiter et al. | |
| 5,130,523 A | * | 7/1992 | Raleigh et al. | 250/202 |
| 5,134,782 A | * | 8/1992 | Breyer et al. | 33/1 M |
| 5,173,613 A | * | 12/1992 | Henry et al. | 250/559.19 |
| 5,402,981 A | * | 4/1995 | McMurtry | 248/638 |

FOREIGN PATENT DOCUMENTS

| | | | | |
|---|---|---|---|---|
| DE | 38 32 331 | 3/1990 | | |
| DE | 41 06 168 | 8/1991 | | |
| DE | 43 28 533 | 3/1995 | | |
| DE | 4328533 A1 | * 3/1995 | ........... | G01B/21/04 |
| DE | 43 45 094 | 7/1995 | | |
| EP | 0 899 536 | 3/1999 | | |
| FR | 2 560 985 | 9/1985 | | |

* cited by examiner

Primary Examiner—Diego Gutierrez
Assistant Examiner—Ryan T. Hayleck
(74) Attorney, Agent, or Firm—Rees Smith LLP

(57) ABSTRACT

In a coordinate measurement device with a base frame, a measurement table supported at the latter for holding an object to be measured, a sensing device for sensing the surface of this object, and with a positioning device for moving the sensing device in three spatial axes over the measurement table, which positioning device is mounted at the base frame and carries the sensing device, the positioning device has a first slide which is guided at the base frame in a first direction and which is movable on one side of the measurement table toward and away from the latter and on which a second slide is movable in a second direction vertical to the first direction, this second slide being provided at its end area remote of the measurement table (considered in its movement direction) with a supporting portion which projects lateral to the measurement table and at which there is arranged a stirrup arm which projects over the measurement table in a direction vertical to a principal work plane of the measurement table. This stirrup arm carries the sensing device at its free end over the measurement table and is constructed as an element that is rigid per se. The first slide and the front area of the second slide situated in front of the supporting portion considered in the movement direction of the first slide can be moved under the measurement table during the movement of the positioning device toward the measurement table.

15 Claims, 6 Drawing Sheets

COORDINATE MEASUREMENT DEVICE

BACKGROUND OF THE INVENTION a) Field of the Invention

The invention is directed to a coordinate measurement device with a base frame, a measurement table supported at the latter for holding an object to be measured, a sensing device for sensing the surface of the object to be measured, and with a positioning device for moving the sensing device in three spatial axes over the measurement table, which positioning device is mounted at the base frame and carries the sensing device.

b) Description of the Related Art

Coordinate measurement devices of the type mentioned above are used for sensing the shape of an object to be measured and for accurately measuring this object. Apart from first-time determination of the geometric data of such an object, coordinate measurement devices can also be used to check the dimensional stability of objects in a manufacturing line.

Coordinate measurement devices are high-precision instruments whose measuring accuracy exceeds that of the manufacturing equipment utilized for producing the object to be measured. In contrast to manufacturing devices, however, the forces occurring during a sensing process remain small.

For sensing larger objects, the prior art discloses coordinate measurement devices in portal-type construction in which the sensing device is arranged at a vertically displaceable spindle sleeve which is mounted at a crosspiece arranged between the two portal columns so as to be displaceable along this crosspiece. Together, the columns with the crosspiece form a portal which spans a measurement table and is movable along the same in air bearings. Due to the portal straddling the measurement table, this known construction provides good structural rigidity, but is relatively uneconomical and needs considerable space. In addition, free access to the measurement table is restricted by the portal-type construction and, with heavy workpieces, the orientation of the precision guides is influenced by the occurring introduction of forces, which results in inaccurate measurements.

In order to meet the requirements for high measuring accuracy, high-precision bearings, usually in the form of air bearings, have been used heretofore in coordinate metrology. A high degree of purity of the surrounding atmosphere and a temperature level that is as constant is possible are required for air bearings, so that these coordinate measurement devices must be operated in special rooms and can not be set up in the immediate vicinity of manufacturing equipment.

OBJECT AND SUMMARY OF THE INVENTION

It is the primary object of the invention to provide a coordinate measurement device which is capable of working with high accuracy and in a highly dynamic manner and which also permits use in the immediate vicinity of manufacturing.

This object is met by a coordinate measurement device of the type mentioned above in which the positioning device has a first slide which is guided at the base frame in a first direction and which is movable on one side of the measurement table toward and away from the latter and on which a second slide is movable in a second direction vertical to the first direction, this second slide being provided at its end area remote of the measurement table—considered in its movement direction—with a supporting portion which projects lateral to the measurement table and at which there is arranged a U-arm or stirrup arm which projects over the measurement table in a direction vertical to a principal work plane of the measurement table and which carries the sensing device at its free end over the measurement table and is constructed as an element that is rigid per se, wherein the first slide and the front area of the second slide situated in front of the supporting portion considered in the movement direction of the first slide can be moved in under the measurement table during the movement of the positioning device toward the measurement table.

Owing to the rigid construction of the stirrup arm and the consequent absence of any guides at the latter, it is possible to construct the stirrup arm in virtually any desired manner without restriction and—in contrast to a surrounding portal at which the sensing device is arranged so as to be movable—there is also no troublesome location-dependent bending of the stirrup arm (depending on its position relative to the measurement table). In cooperation with the supporting portion arranged laterally next to the measurement table, a superior accessibility to the entire surface of the measurement table over which the sensing device can be guided is achieved with the coordinate measurement device according to the invention.

Due to the fact that the stirrup arm used in the arrangement according to the invention has a substantially smaller mass than a portal extending around the measurement table, the coordinate measurement device according to the invention also works with appreciably increased dynamics of the entire system compared to the latter with respect to both principal and secondary processes. In addition, there is a wide variety of possible installation positions of the sensor (vertical, horizontal or other defined position). Moreover, relatively large bearing bases can be provided for the moving parts, which likewise benefits the measuring accuracy and structural rigidity of the device according to the invention.

A particularly compact construction results in that part of the positioning device can be moved under the measurement table. This allows the positioning device to be constructed with a wide, stable base and, accordingly, high rigidity, which again results in high measuring accuracy. When completely moved in, the supporting portion preferably comes into contact with a side edge of the measurement table. Since the supporting action relative to the base frame is caused for the most part by elements which are movable under the table, the supporting area on the side of the supporting portion remote of the measurement table can be relatively narrow and, therefore, particularly the area of the base frame next to the measurement table can also be kept compact with respect to dimensions so that the total setup surface needed for the coordinate measurement device is kept small.

Because of the relatively small mass of the positioning device (compared to a portal construction), the required acceleration forces and retardation forces for feeding the sensing device are also small. This results in a high positioning speed and therefore in heightened dynamics of the coordinate measurement device according to the invention.

Further, the very extensive freedom with regard to the shaping of the stirrup arm makes it possible to optimize the latter with respect to geometry and selection of material while taking into account the forces and moments occurring in a sensing process.

A particularly compact construction for the positioning device is preferably provided in that the stirrup arm is guided at the side of the supporting portion of the second slide facing away from the measurement table. In addition, the guide rails for the movement of the two slides relative to the measurement table can also be kept relatively short in this way, since the installation space needed for the guides of the stirrup arm does not occur as an idle path at these guide rails.

In an advantageous construction of the coordinate measurement device, the bearing support of the stirrup arm at the supporting portion is located approximately at the height of the sensing device provided at the free end of the stirrup arm. Accordingly, tilting moments occurring at the guides of the stirrup arm during a sensing process can be kept small so that measuring accuracy is improved.

The second slide preferably forms a substantially L-shaped section which is formed by the supporting portion extending substantially vertical to a principal work plane of the measurement table and is provided with guide devices for displaceable bearing support of the stirrup arm and by the front portion of the second slide, which front portion is connected with the supporting portion and extends essentially parallel to this principal work plane of the measurement table and is movable under the measurement table. On the one hand, this makes it possible to advance the second slide particularly close to the measurement table so that the stirrup arm can be kept short and, on the other hand, a stable support is achieved in the immediate vicinity of the workpiece to be measured.

The displaceable parts are preferably mounted by means of recirculating ball shoes or saddles on roller bearing-mounted section rail guides.

In order to improve guidance accuracy, the guide devices for the two slides and/or stirrup arm preferably comprise, respectively, two guide rails which are at a distance from one another and parallel to one another. This type of guidance is more robust than the high-precision air bearings used formerly and has good running accuracy. A drive device is preferably associated with the guide rails and is situated centrally therebetween so that there is a uniform introduction of force when the sensing device is advanced, and quantities interfering with the measurements as a result of the drive can be eliminated to a great extent.

In another advantageous construction of the invention, a coupling device is provided at the first slide at the end of the latter located in front with reference to its displacement direction; this coupling device is provided for temporarily coupling an object to be fed to the measurement table or a transport device for such an object, wherein the object or transport device can be drawn toward or onto the measurement table. This is particularly advantageous when the coordinate measurement device is operated in cooperation with an automatic or semi-automatic charging device, since the slide can then simultaneously cooperate in taking over the feed function for advancing the transport device or measured object to the measurement table, so that an independent feed device with separate drive and linked control can be dispensed with.

In another advantageous construction of the coordinate measurement device according to the invention, the stirrup arm mounted on the side of the supporting portion remote of the measurement table engages the supporting portion in such a way that it embraces or encircles it either on top or laterally in the direction of the measurement table.

In another advantageous construction of the invention, the stirrup arm is also mounted so as to be rotatable relative to the second slide, particularly about an axis of rotation parallel to the first direction (Y), so that curved lines or surfaces in particular can be sensed particularly easily.

In order to improve sensing of heavily fissured surface contours as well, the stirrup arm preferably comprises a cantilever arm which extends essentially parallel to the principal work plane of the measurement table and, adjoining the cantilever arm, an arm or stirrup which extends essentially vertical to the principal work plane and which carries, at its end, the sensing device.

In another advantageous embodiment of the invention, the sensing device is constructed as an exchangeable module which, as an add-on unit, can be coupled to and uncoupled from an interface of the stirrup arm designed for coupling different sensing devices. The coordinate measurement device can accordingly be adapted quickly and simply to different measuring tasks. The different sensing devices can be accommodated, for example, in a magazine in the movement area of the free end of the stirrup arm, for example, at an edge of the measurement table in suitable receptacles provided therein, so that sensing devices in the coordinate measurement device can even be exchanged automatically.

Lines are preferably arranged inside the stirrup arm for transmitting signals generated in the sensing device and are accordingly reliably protected from damage and from electromagnetic influences.

In the following, the invention will be explained more fully in principle with reference to the drawings.

DESCRIPTION OF THE PREFERRED EMBODIMENTS

Figure 1:
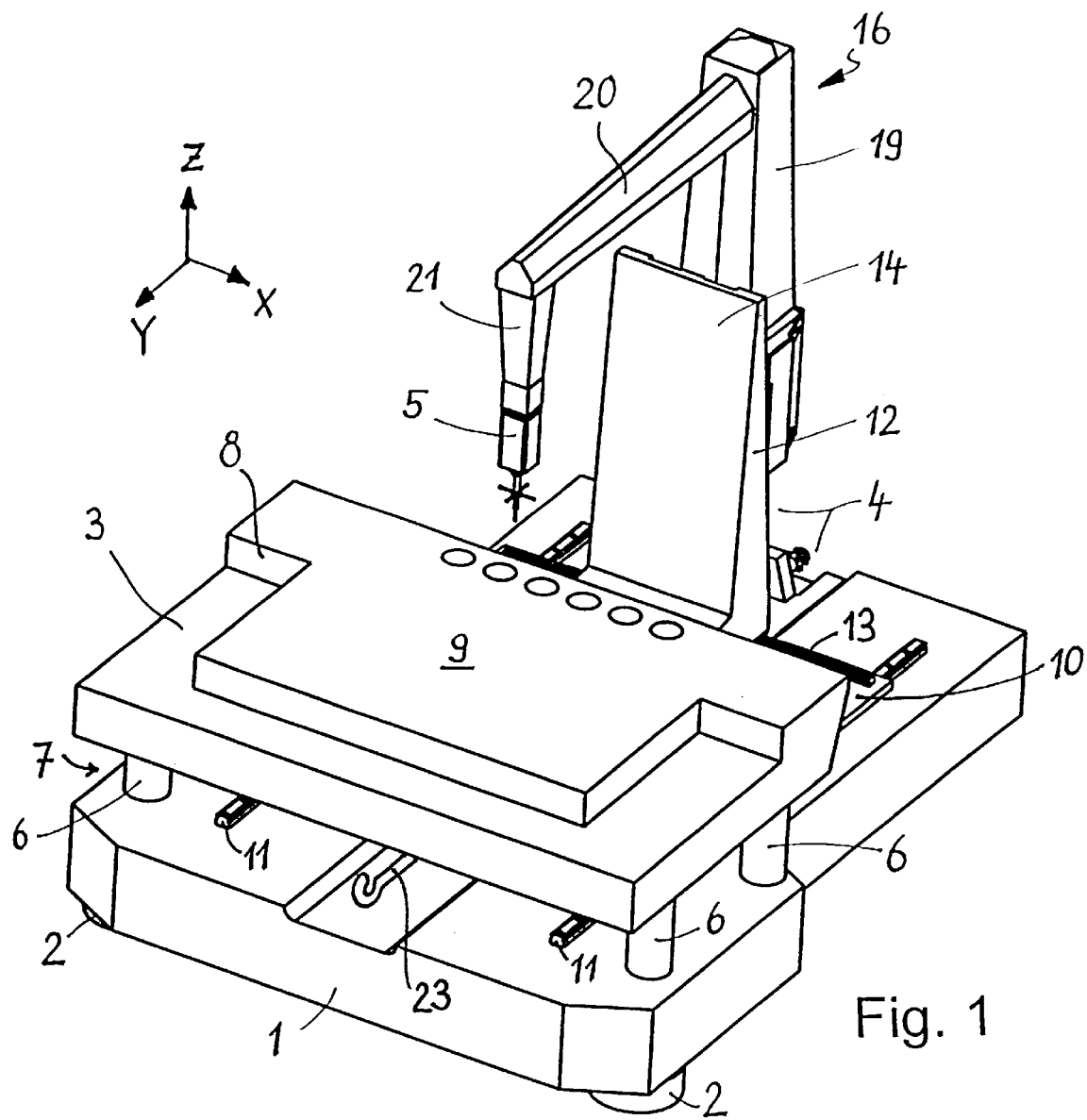
FIG. 1 shows a perspective oblique view of an embodiment example of a coordinate measurement device in the operation-ready state with a stirrup arm in a middle vertical position.

The drawings show a coordinate measurement device for sensing coordinates of an object to be measured, not shown in detail in the drawing, which can be set up in a manufacturing environment.

As will be seen from FIG. 1, the coordinate measurement device first comprises a base frame 1 which is constructed in the embodiment example shown in the drawing as a solid base plate mounted on supports 2. This base frame 1 carries a stationary measurement table 3 for holding an object to be measured, this measurement table 3 covering a partial area of the base frame 1, and a positioning device 4 which is movable in three spatial axes X, Y, Z and at which the actual sensing device 5 is guided relative to the base frame 1.

The measurement table 3 has an essentially rectangular shape in the XY-plane when viewed from above, i.e., in FIGS. 1 to 6. The measurement table 3 is supported at the base frame 1 via four columns 6 arranged at the corners of the measurement table 3, wherein an intermediate space 7 which is accessible from the outside is formed between the measurement table 3 and the base frame 1. The columns 6 are arranged in such a way that the conduction of force from the measurement table 3 to the base frame 1 is effected outside of the area of guide devices for the positioning device 4.

Further, the measurement table 3 comprises a raised area 8 forming a principal work plane 9 for an object to be measured. This facilitates visual inspection to determine whether or not a measurement object is correctly positioned for a sensing process in the active area of the sensing device 5.

In an alternative constructional variant which is not shown in the drawing, a plurality of receiving areas of this kind are provided for holding the objects to be measured. In a special constructional variant, the measurement table 3 is constructed as a revolving table (not shown in the drawings) with two or more receiving areas so that, in this way, a number of objects to be sensed can be changed quickly by moving them into and out of the active area of the sensing device 5 by rotation.

The positioning device 4 is moved with the sensing device 5 relative to the base frame 1 for sensing an object to be measured which is arranged on the measurement table 3. The positioning device 4 has, in addition to the measurement table 3, a supporting portion 14 which projects upward and which is movable relative to the base frame 1 in two spatial axes X and Y parallel to the principal work plane 9. For this purpose, the positioning device 4 comprises first a first slide 10 which is guided at the base frame 1 and is movable in Y-direction with reference to FIGS. 1 to 6. Corresponding guide devices extend from the outside into and through the space 7 formed between the measurement table 3 and the base frame 1. In the embodiment example, the guide devices are formed as profile or section guide rails 11 which are attached to the base frame 1 and extend in parallel, the first slide 10 being mounted in these section guide rails 11 so as to be displaceable by recirculating ball saddles.

As another element of the positioning device 4, a second slide 12 which is displaceable in a transverse direction X vertical to the Y-direction is arranged on the first slide 10. This second slide 12 is guided in the X-direction relative to the first slide 10 at corresponding guide devices 13 (see FIG. 2) which, like the guide devices mentioned above, are likewise formed by two parallel section guide rails with recirculating ball saddles.

Figure 4:
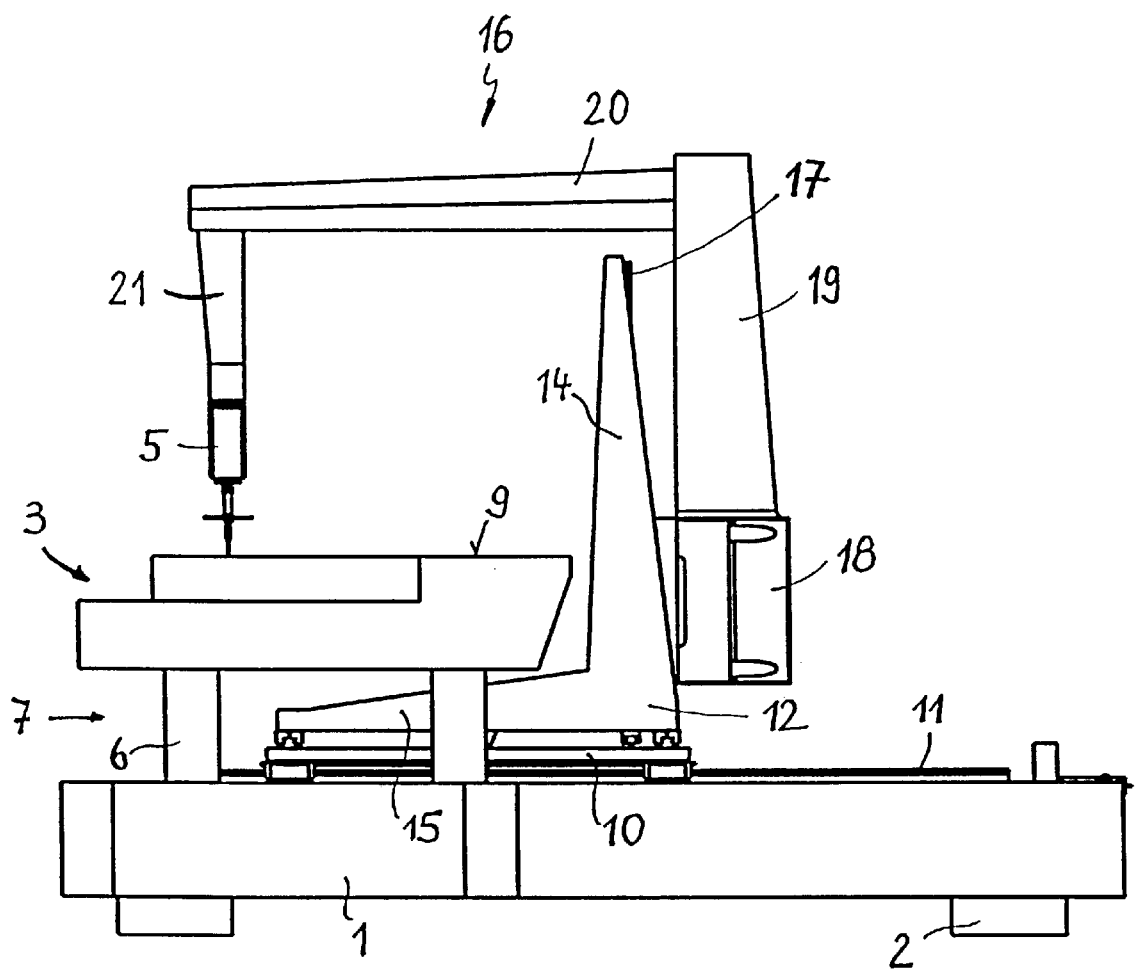
FIG. 4 shows a side view of the embodiment example in the position shown in FIG. 3.
Figure 6:
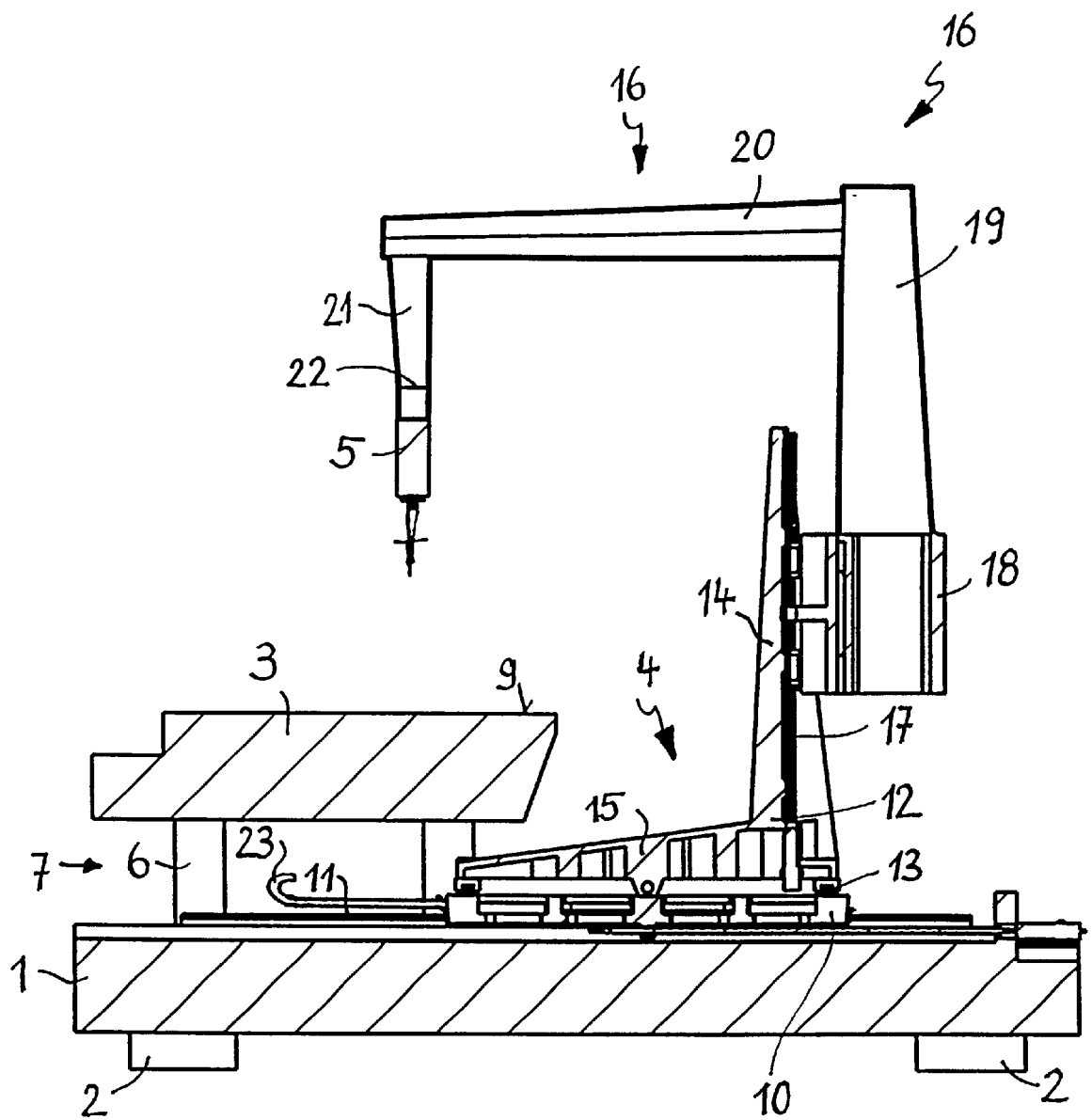
FIG. 6 shows a vertical section through the stirrup arm and an associated positioning device in the position according to FIG. 1 (section A—A in FIG. 2).

As can be seen from FIGS. 4 and 6, the second slide 12 comprises a supporting portion 14 extending essentially vertical to the principal work plane 9 for coupling with an end member of the positioning device 4 supporting the actual sensing device 5 and a front portion 15 which adjoins the vertically projecting supporting portion 14 and is situated in front of the supporting portion 14 considered in movement direction Y of the first slide. The front portion 15 extends essentially parallel to the principal work plane 9 of the measurement table 3 and is mounted on the base frame 1 so as to be displaceable. This results in an overall section for the second slide 12 that is substantially L-shaped when viewed from the side (FIGS. 4 and 6).

As will further be seen from FIG. 6, the front portion 15 serves to widen the supporting base of the second slide 12 at the first slide 10, so that a high degree of stiffness and therefore high guiding accuracy can be realized in the bearing support between the two. Moreover, the first slide 10, together with the front portion 15 of the second slide 12, can be moved into the intermediate space 7 formed between the base frame 1 and the measurement table 3, so that the support of the positioning device 4 can be shifted into the position in which it is completely advanced to the measurement table 3 at least substantially between the measurement table 3 and the frame 1, so that the setup surface of the coordinate measurement device can be kept small. In addition, the support of the base of the positioning device 4 below an object to be measured likewise benefits measuring accuracy.

In order to reduce the inertial mass, the second slide 12 is optimized with respect to the acting forces and moments. Accordingly, the thickness of the supporting portion 14 decreases as the height increases. Correspondingly, the front portion 15 of the second slide 12 is also constructed such that its cross section tapers, in this case, decreases in thickness, in the direction of the guide rail 13 located farther from the supporting portion 14 and extending in X-direction.

A stirrup arm 16 which is movable vertical to the X-Y plane, i.e., in Z-direction, and supports the sensing device 5 is coupled to the supporting portion 14 of the second slide 12, which supporting portion 14 projects above the principal work plane 9 of the measurement table 3. In addition, as is shown in FIG. 6, the supporting portion 14 is provided at its side remote of the measurement table 3 with guide devices which are formed in this case again as two parallel section guide rails 17 which are arranged at a distance from one another and extend in Z-direction and on which recirculating ball saddles run. This arrangement prevents an idle path at the guides in the Y-direction. Because of the smooth-walled construction of the side of the supporting portion 14 facing the measurement table 3, the second slide 12 can be advanced close to the side edge of the measurement table 3 facing it, so that the extension of the stirrup arm 16 can be short in Y-direction. The stirrup arm 16 is constructed as a unit which is rigid per se and can be shaped in substantially any desired manner. Because of the rigid construction of the stirrup arm 16, i.e., due to the absence of any guides at this stirrup arm, the measurement signals generated by the sensing device 5 are maintained virtually independent of location with respect to a sensed object to be measured. As will be seen in FIG. 6, the stirrup arm 16 extends over the front portion 15 of the second slide 12, wherein the free end 22 of the stirrup arm 16 with the sensing device 5 can be located in front of the end of the front portion 15 remote of the supporting portion 14.

The embodiment example shows only one possible shape of the stirrup arm 16. The stirrup arm 16 shown in the Figures comprises first a box-like base portion 18 (FIG. 6) which has guide elements which cooperate with the section guide rails 17 and are located at a distance from one another in X-direction. These guide elements and the guiding of the supported end of the stirrup arm 16 at the supporting portion 14 of the second slide 12 are approximately at the height of the sensing device 5 provided at the free end 22 of the stirrup arm 16. A supporting arm 19 extending in Z-direction, i.e., upward with reference to the Figures, adjoins the base portion 18, the outer cross section of this supporting arm 19 decreasing in upward direction. A cantilever arm 20 extends from the upper end of the supporting arm 19 over the supporting portion 14 essentially parallel to the principal work plane 9 of the measurement table 3 in the direction of the latter. An arm 21 extending substantially in Z-direction adjoins the cantilever arm 20, this arm 21 supporting the actual sensing device 5 at its free end 22. As in the case of the supporting arm 19, the outer cross section of the cantilever arm 20 and arm 21 also decreases in the direction of the sensing device 5 so as to be optimized with respect to the resistance moment or section modulus. In this way, the entire stirrup arm 16 can be formed as a lightweight construction so that it is movable with particularly low acceleration forces like the first slide 10 and second slide 12, which promotes highly dynamic sensing with exact measurement results.

As seen from the side (see FIGS. 4 and 6), the stirrup arm 16 has a U-shape which opens downward by means of which even fissured surface contours can be sensed favorably. In addition, since the second slide 12 is arranged on only one side of the measurement table 3, the latter remains accessible from three spatial directions.

The sensing device 5 itself is constructed in conventional manner so that no further explanation is required for the person skilled in the art. However, the free end 22 of the stirrup arm 16 can be constructed as an interface to which different sensing devices which are specially adapted to determined sensing tasks can be coupled. The different sensing devices are advisably stored in a magazine (not shown) in the active area of the stirrup arm 16 so that they can also be accessed automatically as required. This magazine can be provided, for example, in or at the measurement table 3.

The transmission of signals generated in the sensing device 5 is carried out via lines which extend inside the stirrup arm 16 so as to prevent damage, wherein the signals are evaluated in a manner known per se in an evaluating device.

In order to move the sensing device 5 along the measured surface of an object, the elements of the positioning device 4, i.e., the first slide 10, second slide 12 and stirrup arm 16, are moved relative to one another and relative to the measurement table 3; suitable drive devices, not shown, are provided in the area of the respective guide devices for this purpose. These drive devices are arranged in such a way that a force acts centrally in the area between the respective section guide rails in the direction of the respective spatial axis so as to minimize forces or moments impairing the measurement results.

Figure 2:
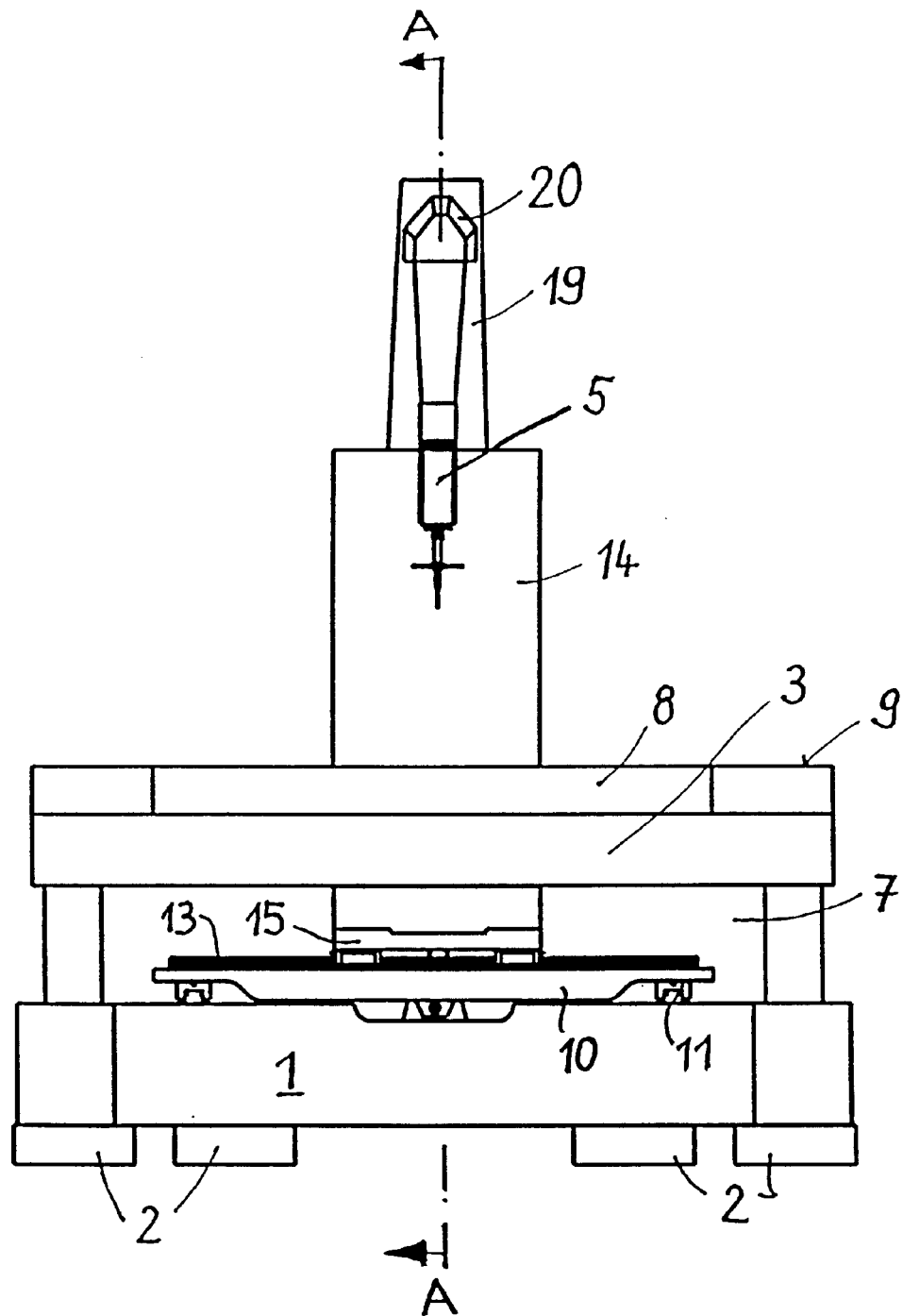
FIG. 2 shows a front view of the embodiment example in the position shown in FIG. 1.
Figure 3:
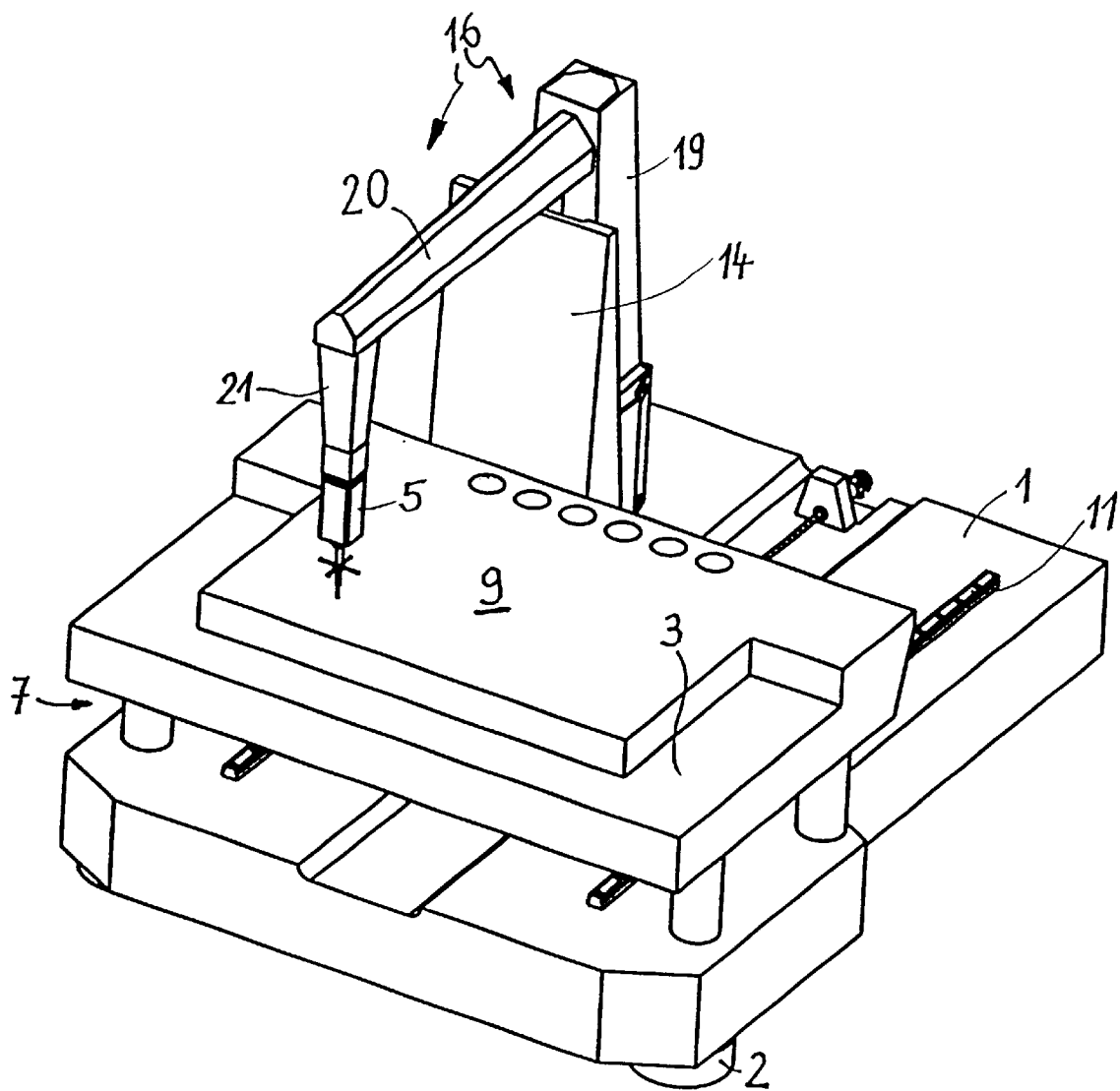
FIG. 3 shows a perspective oblique view of the embodiment example of FIG. 1 with the stirrup arm in a lower position.
Figure 5:
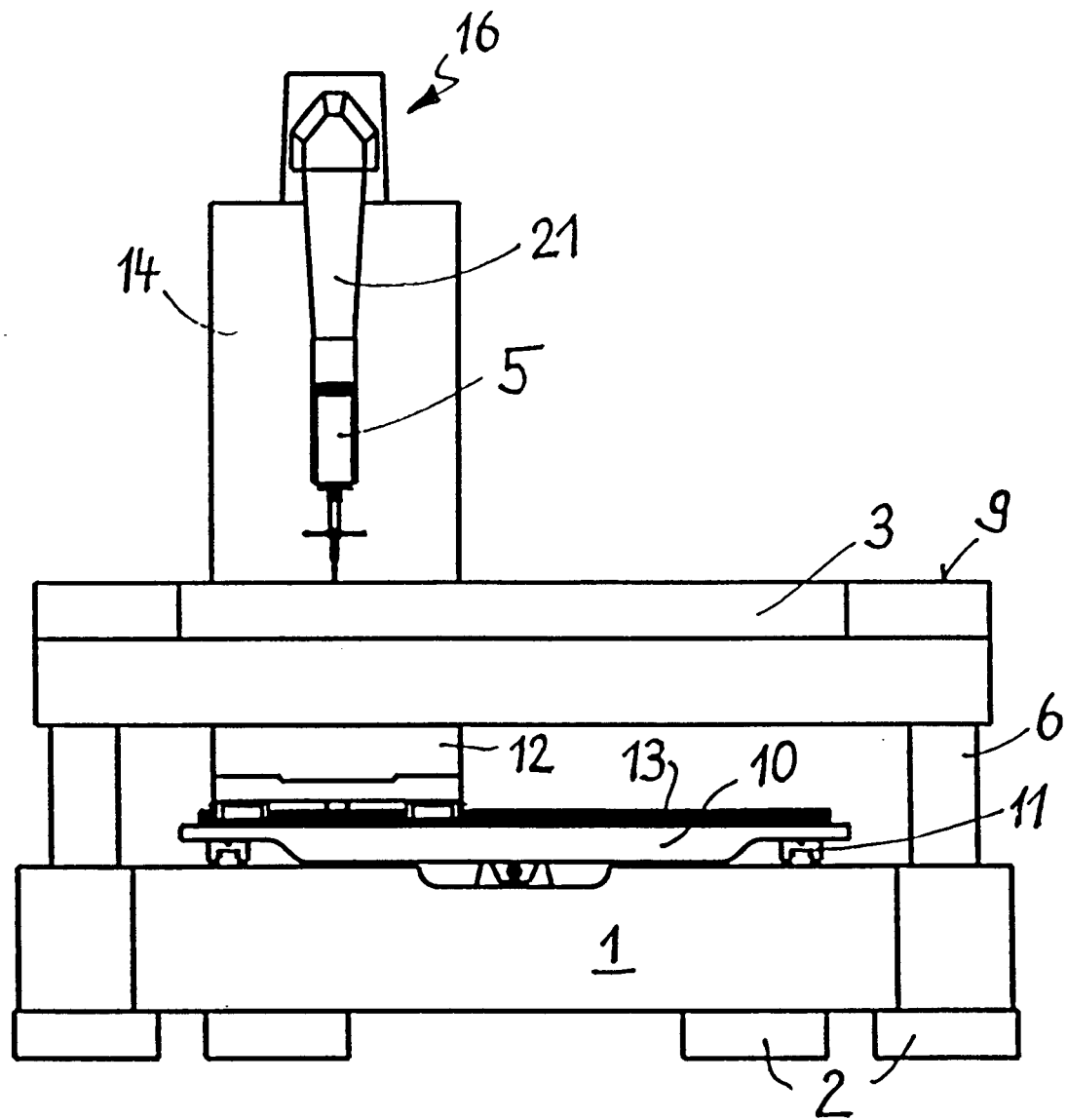
FIG. 5 shows a front view of the embodiment example in the position shown in FIG. 3.

Some possible operating positions of the coordinate measurement device and particularly of the sensing device 5 in relation to the measurement table 3 are shown by way of example in the Figures. FIG. 1 shows a position in which all elements of the positioning device 4 occupy a central position in relation to their respective possibilities for displacement, while FIG. 3 shows a position in which the positioning device is advanced completely to the measurement table 3, wherein the second slide 12 occupies a lateral end position in X-direction and the stirrup arm 16 is located in its bottommost position in which the cantilever arm 20 remains slightly above the upper edge of the supporting portion 14. FIG. 2 shows a front view of the device from FIG. 1, FIG. 4 shows a side view, and FIG. 5 shows a front view of the device from FIG. 3.

The coordinate measurement device described above is suitable particularly for use in the immediate vicinity of manufacturing, for example, in the area around a continuous production line from which the individual products or all products are removed and continuously monitored with respect to dimensions. Because of its highly dynamic behavior, the coordinate measurement device can also be completely integrated into the production line without interfering with efficient manufacturing.

In a constructional variant shown only in FIG. 1 and FIG. 6 (corresponding to section A—A in FIG. 2), a coupling device 23 is provided at the first slide 10 for temporary connection of the same to a transport device designed to hold an object to be measured. In this way, transport devices (not shown) and objects to be measured are advanced to the measurement table 3 using the drive device of the first slide 10 and, in so doing, are transferred, e.g., to the measurement table 3 and measured at the latter by means of the sensing device 5 which is moved by the positioning device 4.

The stirrup arm 16 can also be arranged so as to be rotatable about an axis parallel to the Y-axis relative to the second slide 12 to enable fast sensing of a curved surface. A suitable rotational bearing could be integrated, e.g., in the base portion 18 of the supporting portion 14.

While the foregoing description and drawings represent the preferred embodiments of the present invention, it will be obvious to one skilled in the art that various changes and modifications may be made therein without departing from the true spirit and scope of the present invention.

What is claimed is:

1. A coordinate measurement device comprising:

a base frame;

a measurement table supported at the base frame for holding an object to be measured;

a sensing device for sensing the surface of the object to be measured; and a positioning device for moving the sensing device in three spatial axes over the measurement table;

said positioning device being mounted at the base frame and carrying the sensing device;

said positioning device having a first slide which is guided at the base frame in a first direction and which is movable on one side of the measurement table toward and away from the measuring table and on which a second slide is movable in a second direction vertical to the first direction;

said second slide being provided at an end area thereof remote of the measurement table, considered in its movement direction, with a supporting portion which projects lateral to the measurement table and at which there is arranged a stirrup arm which projects over the measurement table in a direction vertical to a principal work plane of the measurement table and which carries said sensing device at a free end thereof over the measurement table and being constructed as an element that is rigid per se;

said first slide and a front area of the second slide situated in front of the supporting portion considered in the movement direction of the first slide being capable of being moved in under the measurement table during the movement of the positioning device toward the measurement table.

2. The coordinate measurement device according to claim 1, wherein the stirrup arm is displaceably mounted at the supporting portion of the second slide at its side remote of the measurement table.

3. The coordinate measurement device according to claim 2 and wherein the bearing support of the stirrup arm at the supporting portion is located approximately at the height of the sensing device provided at the free end of the stirring arm and wherein the stirrup arm projects upward over the supporting portion in the direction of the measurement table.

4. The coordinate measurement device according to claim 2 and wherein the bearing support of the stirrup arm at the supporting portion is located approximately at the height of the sensing device provided at the free end of the stirring arm and wherein the stirrup arm projects over the supporting portion laterally in the direction of the measurement table.

5. The coordinate measurement device according to claim 1, wherein the bearing support of the stirrup arm at the supporting portion is located approximately at the height of the sensing device provided at the free end of the stirrup arm.

6. The coordinate measurement device according to claim 1, wherein the positioning device is movable toward the measurement table until the supporting portion contacts the side surface of the measurement table facing it.

7. The coordinate measurement device according to claim 1, wherein the second slide forms a substantially L-shaped section which is formed by the supporting portion that extends substantially vertical to a principal work plane of the measurement table and is provided with guide devices for displaceable bearing support of the attached end of the stirrup arm and by the front portion of the second slide, which front portion is connected with the supporting portion and extends essentially parallel to the principal work plane and portions of which can be moved into the space defined between the measurement table and the base frame.

8. The coordinate measurement device according to claim 7, wherein the stirrup arm is also mounted so as to be rotatable relative to the second slide.

9. The coordinate measurement device according to claim 1, wherein the first slide at the base frame or the second slide at the first slide or the stirrup arm at the supporting portion of the second slide is displaceably mounted by recirculating ball saddles on roller bearing-mounted section rail guides.

10. The coordinate measurement device according to claim 9, wherein there is arranged at the first slide at the end of the latter located in front with reference to its displacement direction a coupling device which projects from the latter for temporarily coupling an object to be fed to the measurement table or a transport device for this object.

11. The coordinate measurement device according to claim 1, wherein each of the two slides and the stirrup arm are movably guided via two guide rails which are at a distance from one another.

12. The coordinate measurement device according to claim 11, wherein a drive device is associated with the guide rails, respectively, and acts centrally between the section rails at the parts which are displaceable relative to one another along the respective spatial axis.

13. The coordinate measurement device according to claim 1, wherein the measurement table is constructed as a revolving table.

14. The coordinate measurement device according to claim 1, wherein the stirrup arm comprises a cantilever arm which extends essentially parallel to the principal work plane of the measurement table and, adjoining the cantilever arm, an arm which extends essentially vertical to the principal work plane and which carries, at its end, the sensing device.

15. The coordinate measurement device according to claim 1, wherein the sensing device is constructed as an exchangeable module which, as an add-on unit, can be coupled to and uncoupled from an interface of the stirrup arm designed for coupling different sensing devices.

* * * * *